(12) United States Patent
Holloway et al.

(10) Patent No.: US 8,162,753 B2
(45) Date of Patent: Apr. 24, 2012

(54) VIDEO GAME PROVIDING SIMULATED DISC JOCKEY EXPERIENCE

(75) Inventors: James Holloway, Santa Monica, CA (US); Scott Humphries, Playa Del Rey, CA (US)

(73) Assignee: Electronic Arts Inc., Redwood City, CA (US)

( * ) Notice: Subject to any disclaimer, the term of this patent is extended or adjusted under 35 U.S.C. 154(b) by 1236 days.

(21) Appl. No.: 11/868,107

(22) Filed: Oct. 5, 2007

(65) Prior Publication Data

US 2009/0093302 A1    Apr. 9, 2009

(51) Int. Cl.
*A63F 13/00* (2006.01)
*A63F 9/24* (2006.01)
(52) U.S. Cl. .............. 463/35; 463/36; 463/42; 345/473
(58) Field of Classification Search .............. 463/35, 463/36, 42; 345/473; 273/138.1
See application file for complete search history.

(56) References Cited

U.S. PATENT DOCUMENTS

| | | | |
|---|---|---|---|
| 6,227,968 B1* | 5/2001 | Suzuki et al. | 463/7 |
| 6,582,309 B2* | 6/2003 | Higurashi et al. | 463/31 |
| 7,208,669 B2* | 4/2007 | Wells et al. | 84/601 |
| 7,695,369 B2* | 4/2010 | Winkler | 463/42 |
| 2004/0133559 A1* | 7/2004 | DeVorzon et al. | 707/3 |
| 2005/0255914 A1* | 11/2005 | McHale et al. | 463/31 |
| 2006/0265378 A1* | 11/2006 | Koseki | 707/9 |
| 2008/0016201 A1* | 1/2008 | Thompson | 709/223 |

OTHER PUBLICATIONS

RemyWiki, "What is Beatmania IIDX?", Oct. 20, 2006 as evidenced via the www.archieve.org, retrieved from the Internet on Jun. 20, 2011 from <http://vjarmy.com/wiki/index.php/What_Is_Beatmania_IIDX>.*

* cited by examiner

*Primary Examiner* — Dmitry Suhol
*Assistant Examiner* — Ryan Hsu

(57) ABSTRACT

Embodiments of the present invention include methods for providing a simulated disc jockey experience in a video game. Embodiments are provided for playing video games on portable electronic devices such as mobile phones and/or portable music players and on conventional video game clients, such as video game consoles, personal computers, and/or handheld video game devices.

23 Claims, 6 Drawing Sheets

VIDEO GAME PROVIDING SIMULATED DISC JOCKEY EXPERIENCE

BACKGROUND OF THE INVENTION

As many portable electronic devices, such as mobile phones and portable music players, have evolved to include increasingly power graphics processing capabilities and often include full-color displays, these devices have become powerful enough to be exploited as a video gaming platform. However, portable electronic devices such as these are often not designed with video game play in mind. As a result, developers creating video games for these non-traditional gaming platforms may face a number of challenges. For example, portable electronic devices such as mobile phones often include a limited amount of memory for storing and processing game data and display screen size on these devices is often limited in the interest of limiting power consumption and the size of the device. Furthermore, these portable electronic devices often do not include the types of user input devices typically included with more traditional video game consoles, such as a joystick or a game pad for receiving player input. Game developers for such portable devices may also face other challenges, such as devices with limited or no network capability, which may inhibit the dispersion of content to the portable devices in addition to inhibiting sharing of content between players.

Portable gaming solutions that address these and other problems faced by developers of games for portable electronic devices are desired.

BRIEF SUMMARY OF THE INVENTION

Embodiments of the present invention include methods for providing a simulated disc jockey experience in a video game. Embodiments are provided for playing video games on portable electronic devices such as mobile phones and/or portable music players and on conventional video game clients, such as video game consoles, personal computers, and/or handheld video game devices.

According to an embodiment, a method for playing a video game on a video game client. The video game client includes a display output configured to produce a video signal for outputting a video game display that, when viewed, provides a viewer with a view of a simulated game environment, and user input devices for obtaining user input. The method includes the steps of executing a video game program on the video game client, selecting a song from the plurality of song files, determining, at least in part, the animation of one or more game characters, based upon one or more attributes of the song and one or more attributes of the one or more game characters, and animating a simulated environment include the one or more game characters. Animating the simulated environment includes producing a display output signal via the display output. The controlling of the animation of one or more game characters may comprising animating the one or more game characters to enter a dance floor of virtual club and to dance to the song being played in a simulated environment on a computer.

According to another embodiment a method for playing a video game on a video game client is provided. The video game client includes a display output configured to produce a video signal for outputting a video game display that, when viewed, provides a viewer with a view of a simulated game environment, and user input devices for obtaining user input. The method includes the steps of receiving a selection of a set of audio files from a plurality of audio files. The method also includes the step of compositing the selected set of audio files into a composited audio file. The method further includes determining, at least in part, the animation of one or more game characters, based upon one or more attributes of the song and one or more attributes of the one or more game characters, and animating a simulated environment include the one or more game characters.

According to yet another embodiment, a method for playing a video game on a video game client is provided. The video game client includes a display output configured to produce a video signal for outputting a video game display that, when viewed, provides a viewer with a view of a simulated game environment, and user input devices for obtaining user input. The method comprises playing a song in the video game. The method also includes using an input device on the portable electronic device as a scratch input device to produce a scratch input, and overlaying over the song scratch sound effects produced by using the input device as a scratch input device. The method also includes determining the animation of at least one or more game characters, based at least in part upon one or more attributes of the song and one or more attributes of the song and one or more attributes of the game characters, and animating the one or more game characters to produce an output video signal for display on a display device, where the output video signal, when viewed, provides a visual representation of a simulated game environment.

Other features and advantages of the invention will be apparent in view of the following detailed description and preferred embodiments.

DETAILED DESCRIPTION OF THE INVENTION

Figure 1:
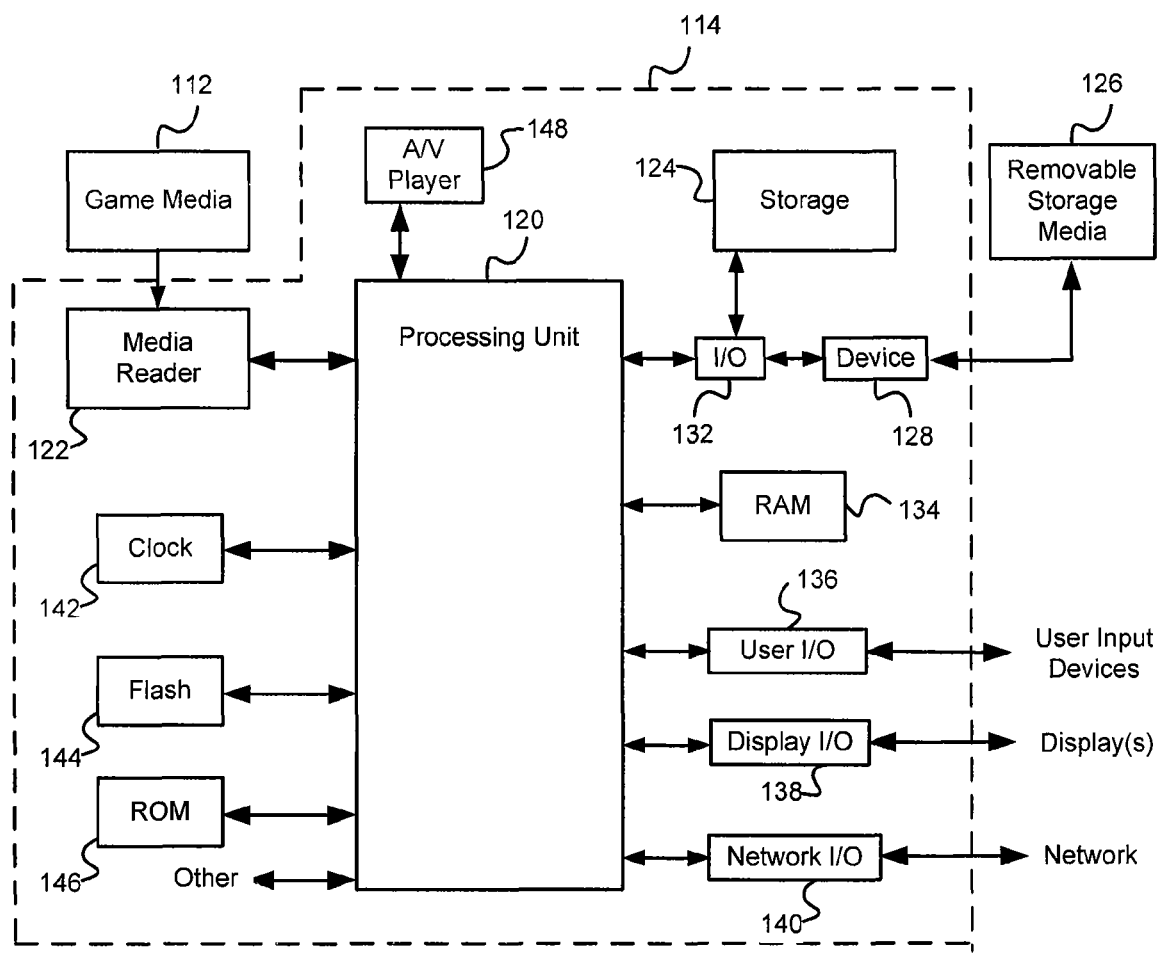
FIG. 1 illustrates an embodiment of a video game client according to an embodiment.

FIG. 1 illustrates an embodiment of a video game client according to an embodiment. Portable electronic device 114 configured for playing video games according to an embodiment. According to an embodiment, portable electronic device is a mobile telephone configured for playing video games. In other embodiments, portable electronic device 114 may be a portable music player, such as an MP3 player or other portable music player configured to play digital audio files. One skilled in the art will recognize that other variations of portable electronic device 114 may be substituted from the examples described herein without departing from the spirit of the present invention.

One skilled in the art will also recognize that embodiments of the present invention may be implemented for conventional video game clients, such as video game consoles and/or personal computers. The various embodiments described herein, however, focus on embodiments for portable electronic devices, which may present special challenges for video game developers due to various technical limitations of portable electronic devices that are typically not present in conventional video game clients, such as video game consoles and/or personal computers. For example, the portable electronic devices may include limited memory for storing and processing data, limited processor power for performing complex graphics processing computations, a smaller display size of limited color palette, and/or a user interface not originally designed or intended for use as a user interface for playing video games.

Returning now to the embodiment illustrated in FIG. 1, portable electronic device 114 includes a processing unit 120 that interacts with other components of portable electronic device 114 and also interacts with external components to portable electronic device 114. Portable electronic device 114 further may also optionally comprises a media reader 122 that communicates with game media 112. Game media 112 may be a persistent memory that stores game software, such as executable program code, configuration data, images, and/or other video game content. Game media 112 may comprise any number of persistent memory storage media such as optical media, cartridges, flash memories (such as a Secure Digital (SD) card), a read-only memory (ROM), and/or other persistent storage medium. Media reader 122 may be any reader that can receive and read data from game media 112.

Portable electronic device 114 also includes various components for enabling input/output, such as I/O 132, user I/O 136, display I/O 138, and network I/O 140. I/O 132 interacts with storage 124 and, through device 128, removable storage media 126 in order to provide storage for portable electronic device 114. Processing unit 120 communicates through I/O 132 to store data, such as game state data and/or any shared data files. In addition to storage 124 and removable storage media 126, portable electronic device 114 includes random access memory (RAM) 134. RAM 134 may be used for data that is accessed frequently, such as game state data while a game is being played.

Display output signals produced by display I/O 138 comprising signals for displaying visual content produced by portable electronic device 114 on a display device, such as graphics, user interfaces, video, and/or other visual content. Portable electric device 114 may comprise one or more integrated displays configured to receive display output signals produced by display I/O 138. According to some embodiments, display output signals produced by display I/O 138 may also be output to one or more display devices external to portable electronic device 114.

User I/O 136 is used to send and receive commands between processing unit 120 and user devices, such as game controllers, clickwheel devices, and/or other user input devices. The user devices may, according to some embodiments, be integrated into portable electronic device 114, while in other embodiments, the user devices may be external to portable electronic device 114. Display I/O 138 provides input/output functions that are used to display images from the game being played. Network I/O 140 is used for input/output functions for a network. Network I/O 140 may be used if a game is being played on-line or being accessed on-line.

According to some embodiments, portable electronic device 114 may be a mobile phone and network I/O provides wireless connectivity to a mobile phone provider's network. Network I/O may also provide Internet connectivity via a wireless connection. Some embodiments may enable players to download game content to portable electronic device 114 from the mobile phone provider and/or from the Internet. Players may also be able to receive content from a network game server, upload content to the network game server. Players may also share content via the network game server or directly, such as through a Bluetooth connection or other connection between portable electronic device 114 and another electronic device.

According to some embodiments, portable electronic device 114 may not have network access and therefore may not include network I/O 140. For example, some portable electronic device, such as a portable music player, may download content such as songs, games, video content, software and other data by linking to a host computer via a wired or a wireless connection and downloading the content to the portable music player.

Portable electronic device 114 also includes other features that may be used with a game, such as a clock 142, flash memory 144, read-only memory (ROM) 146, and other components. An audio/video player 148 is also used to play a video sequence such as a movie.

The embodiments of portable electronic device 114 described herein are merely exemplary and one skilled in the art will recognize that additional and/or alternative components may be included variations of portable electronic device 114 according to alternative embodiments.

Mobile Phone Games

According to some embodiments of the present invention, an interactive DJ (disc jockey) game is provided for play on mobile phones and other portable electronic devices. An objective of the DJ game is to create songs to play in a virtual club that will entice as many simulated club-goers to the dance floor as possible. Songs are created by compositing audio clips selected by a player. Audio clips are selected from a plurality of audio clips stored on the portable electronic device.

While the embodiments described above make reference to mobile phones as a portable gaming platform, one skilled in the art will recognize that the embodiments described above may also be implemented on other types of portable electronic devices. For example, embodiments of the present invention may be implemented on a portable music player, such as an MP3 player. While some features tailored for mobile phones may not be available in embodiments tailored for portable electronic devices that are not mobile phones, such as saving a song as a ringtone, additional features tailored for other types of portable electronic devices, such as saving a song created by a player as an audio track on a portable music player may be provided. Furthermore, one skilled in the art will recognize that the embodiments described herein may be adapted for play on conventional video game clients, such as video game consoles and/or personal computers.

Figure 2:
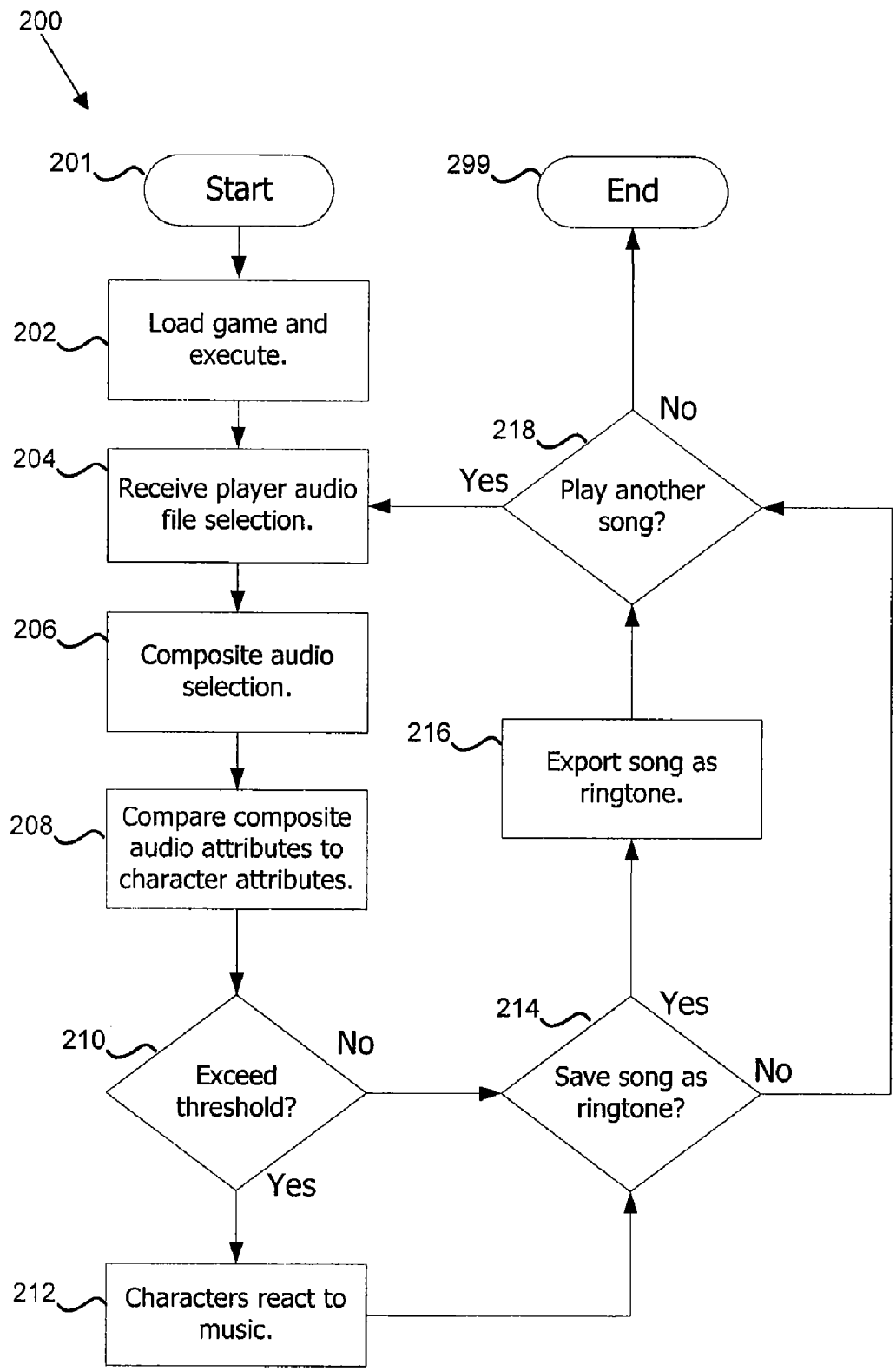
FIG. 2 illustrates the flow of execution of a game loop according to an embodiment.

FIG. 2 illustrates the flow of execution of a game loop 200 according to an embodiment. Game loop 200 begins with step 201 and continues with step 202. At step 202, the game software program is loaded and executed by a portable electronic device, such as portable electronic 114 described above. The game software may be stored on game media (such as game media 112), a removable media (such as removable storage media 126), downloaded to the device and stored in a local memory (such as RAM 134, flash memory 144, and/or storage 124), and/or be installed in a memory residing in the device at the time that the device is manufactured (such as ROM 146). According to an embodiment, the game software is loaded from memory on the portable electronic device and executed by processing unit 120. As the game software is loading, the player may be presented with a splash screen that identifies the game being loaded and provides something may provide a graphical and/or textual indicator that displays the progress of the game being loaded.

According some embodiments, the game produces a user interface for display on a display device that presents a view of a scene of a virtual club that includes a plurality of simulated club-goers. The player's role to act as a DJ for the virtual club by creating and playing songs that will appeal to as many of the simulated club-goers as possible. An objective of the game is to entice the simulated club-goers out onto a dance floor to dance by creating and playing songs that appeal to the simulated characters. According to some embodiments, each of the simulated characters includes one or more attributes that control, at least in part, how the simulated characters react to songs being played. A detailed explanation of the interaction between character and song attributes is provided below.

Returning now to game loop 200, after step 202 is completed, the process continues with step 204. At step 204, the game software receives audio file selections from the user in order to construct one or more songs that will be played for the simulated club-goers of the virtual club. A song is created by compositing together a plurality of audio files selected by the player.

According to an embodiment, a song comprises multiple tracks and a player creates a song by selecting an audio file from a plurality of audio files for each track of the song. For example, according to some embodiments, a song comprises four tracks: a bass track, a drum track, and FX1 (lead) track, and an FX2 (backup) track, and a player creates a song by selecting an audio file associated with each of the tracks. Once the player selects an audio file for each track, the song is created by compositing the tracks into a song (in step 206). According to some embodiments, a player may select audio files for only a subset of the tracks and/or may select multiple audio files for each track. Furthermore, according to other embodiments, the number of tracks that comprise a song may vary.

According to a preferred embodiment, the audio files are Musical Instrument Digital Interface (MIDI) files. A plurality of MIDI files is provided for each of the tracks that comprise a song. Each of the audio files are recorded using the same sample rate, tempo and key in order to ensure that each of the audio files will be compatible, thus enabling the player to choose from any of the plurality of audio files available for each track, and thus also increasing the number possible permutations of songs that a player might create.

Embodiments of the game include a default set of audio files. For example, according to an embodiment one hundred and sixty MIDI audio file, including forty audio files for each of the four tracks, are provided. Furthermore, according to some embodiments, a player may purchase and/or download additional audio files to the portable electronic device in order to increase the library of audio files that the player has available for use in building songs the game.

The audio files may be stored on game media (such as game media 112), a removable media (such as removable storage media 126), downloaded to the device and stored in a local memory (such as RAM 134, flash memory 144, and/or storage 124), and/or be installed in a memory residing in the device at the time that the device is manufactured (such as ROM 146).

Returning now to game loop 200, at step 206, the audio files selected by the player are composited into a song, and the song is played in the game. According to a preferred embodiment, the player has selected MIDI files for each track of the song. The game logic composites the selected MIDI files into a single composited MIDI file that will be played within the game. According to alternative embodiments, other audio file formats may be used and a composited audio file is created using the audio file format of audio files selected by the player.

At step 208, as the song is played, one or more attributes of the song are compared with one or more attributes of each of the simulated club-goers in the virtual club to determine whether any of the simulated club-goers will dance to the song.

Each character has a set of attributes associated with that character that define the type of music that the character prefers and/or dislikes. For example, a character may prefer fast songs and songs that fall within the rock genre, while the character dislikes songs that are slow and fall into the country genre. If the player plays a fast hip hop song, then the character may enter the dance floor and begin dancing, because the player has created a fast song (even though the song was not a rock song). However, if the player creates a type of song that a character dislikes, the character may refuse to enter the dance floor. For example, if the player creates a slow country song, the character that likes fast rock songs described above might either refuse to enter the dance floor or leave the dance floor if already on the dance floor when the song is played.

According to some embodiments, the player may be provided certain visual clues as to the preferences of the simulated club-goers. For example, the appearance of the virtual club and simulated club-goers may provide some indication as to the type of music that the simulated club-goers prefer, thus enabling the player to determine the type of music to play in order to encourage as many simulated club-goers as possible to enter the dance floor and begin dancing.

At step 412, a determination is made whether the song created by the player has matched enough attributes associated with each of the simulated party-goers. According to some embodiments, each attribute associated with a character is assigned a corresponding numerical value. The game logic compares the attributes of the song created by the player to the attributes associated with each character. For each character, an affinity value for the song is determined by summing up the numerical values assigned to each of the attributes associated with the character that match the attributes of the song. Negative values might also be assigned to attributes related to a characters dislikes, so that if a song matches these attributes, the character's affinity value determined for that song will be decreased (which may result in the affinity value falling below the threshold).

If the affinity value that a character has for a song exceeds a predefined threshold value, then the character may dance to the song. However, if the affinity value determined for the character for the song is less than the threshold, then the character may leave the dance floor if already dancing or may not enter the dance floor if not already dancing.

According to some embodiments, a global threshold value is predefined and applies to all of the simulated club-goers. According to other embodiments, each of the simulated party-goers may have an individual associated threshold value that must be met (by matching attributes of the song to preferred attributes associated with the character) before the character will enter the dance floor. Characters with lower thresholds may be enticed onto the dance floor more easily than characters with higher thresholds. Threshold values assigned to various attributes may also be weighted in accordance with some embodiment, and attributes with a higher weighted value are given more weight when determining if the threshold for a character has been met or exceeded.

At step 212, those characters whose affinity for the song exceeds the threshold react to the song by entering the dance floor and dancing. However, those characters whose affinity for a song was less than the threshold may also leave the dance floor. According to some embodiments, the player is awarded points and/or virtual cash for each character that dances to a particular song. According to other embodiments, the player may also lose points and/or virtual cash for each player that leaves the dance floor in response to the song that the player created. After step 212, the process continues with step 214.

At step 214, the user is presented with the option to save the song as a ringtone. After the song is created by compositing the various audio files selected by the player, the song may optionally be exported as a ringtone. According to some embodiments, the game logic performs additional processing on the composited audio file that comprises the player-created song in order to make the composited audio file useable as a ringtone.

According to some embodiments, the portable electronic device configured for playing the game is a mobile phone capable of playing MIDI ringtones and the audio files used by the player to construct songs comprise MIDI audio files. The game logic provides the user with an opportunity to export the song as a MIDI ringtone. The game program code may optionally perform additional processing on the MIDI file in order to make the audio file available or use as a ringtone. For example, the file may need to be stored in a specific area of memory on the portable electronic device and/or some additional conversion may need to be performed on the file in order to make the MIDI file useable as a ringtone. According to other embodiments, the video game may be implemented on a device that is not configured for the use of ringtones, such as a portable electronic device and/or a conventional video game console. However, the portable electronic device and/or other video game client may include logic for creating a ringtone and for uploading the ringtone an electronic device configured to use ringtones and/or for uploading the ringtone to a server from with the ringtone may be downloaded for use on a portable electronic device.

If the user chooses to save the song as a ringtone, the song is exported and/or converted in step 216. Otherwise, the process continues with step 218.

At step 218, the player is presented with the option to play another song. If the player elects to play another song and to continue the game, the process returns to step 204. Otherwise, the game loop process ends at step 299 and the game ends.

As described above, certain portable electronic devices may not be network-enabled such that they are not able to upload and/or download files or share files with other portable electronic devices via a network connection. However, some embodiments include alternative functionality for sharing content between players using different portable electronic devices. One example of alternative functionality for content sharing is included in some embodiments. In these embodiments, the game logic includes functionality for creating alphanumeric coded versions of content that enables the content to be shared with other portable electronic devices without requiring that the content itself be sent. For example, a song created by a user may be converted to a 60-bit alphanumeric code. The code may include the names and/or locations of audio files used to create the song, instructions for assembling the song from the audio files, and/or other data used to recreate content on another player's portable electronic device without requiring that the content itself be transmitted between devices. According to some embodiments, the alphanumeric encoded string may include a song name for a song encoded in the string, a track identifier for each of the tracks included in the song, such as a filename identifying an audio file associated with a track and/or another unique identifier, such as a uniform resource identifier ("URI") for identifying network content, a tempo value for the song, a mix score, a mix value, a bass score, a drum score, an FX (lead) track score, a FX2 (back-up) track score, and/or a security feature to prevent hacking and/or alteration of the code.

The alphanumeric code may be transferred to another device by various means, such as via a text message, email, and/or other similar communication, or may alternatively be manually entered into the portable electronic device via a keypad or other user interface. According to some embodiments, the alphanumeric code may also be transferred to or from a player's portable electronic device using Wireless Access Protocol ("WAP") and/or other protocol for exchanging data with wireless devices. For example, a portable electronic device may include a WAP-compliant browser that enables a player to view webpages written in or converted to Wireless Markup Language ("WML") and/or another compatible markup language that may be used for formatting content for viewing within a browser. A player may, for example, connect to a website via the WAP-compliant browser included on the player's portable electronic device and upload alphanumeric encoded content and/or download alphanumeric content created by other players.

A portable electronic device receiving an alphanumeric encoded string decodes the string in order to extract the information needed to reconstruct the content encoded in the alphanumeric string without having actually received the content encoded in the alphanumeric string. For example, the alphanumeric information may comprise song data identifying the audio files associated with each track of a song, enabling the receiving portable electronic device to construct the song using the audio track referenced in the alphanumeric encoded string.

The alphanumeric encoding functionality enables content to be shared even between devices that have no communication functionality. Content sharing may also promote the development of a "community" comprising fans of the game content. Communities of players with a common interest in a game may develop as a forum for players to discuss game play, trade game tips and tricks, and/or to share player-created content. Often, these communities may develop as online chat forums, message boards, and/or websites where players communicate with other players with similar interests. Internet connectivity is typically required to access such sites, and devices that are not network-enabled typically cannot upload or share content with other players in such forum. However, by encoding content into an alphanumeric string that can be read and decoded by other devices, players may share content even on devices that are not network enabled by manually entering an encoded string into portable electronic device configured to receive encoded content.

Encoded content may also facilitate the sharing of content between network-enabled devices by communicating encoded alphanumeric strings used to build content rather than the content itself. Networked portable electronic devices may benefit by exchanging alphanumeric-encoded content because the alphanumeric content may consume much less network bandwidth when transferred across the network when compared to the amount of network bandwidth that may be required to transmit binary content represented by the alphanumeric-encoded content. For example, a player may share his or her DJ crate (described in greater detail below) comprising a list of songs that the player has acquired during the course of game play. The DJ crate may alphanumerically-encoded and transferred to another device, enabling another player to play the game with the same set of songs as the player that shared the song list. The audio files comprising the songs are not encoded and transferred (due to copyright restrictions and/or the size of the binary audio files—such as MP3 files that comprise the data for each song). Furthermore, devices with slow network connections and/or network connections with very limited bandwidth may also advantageously share alphanumeric-encoded content.

Portable Music Player Games

Yet other embodiments of the present invention provide an interactive DJ game for play on portable electronic devices such as portable music players. The embodiments disclosed in this section make reference to portable music players, but may also, according to some embodiments, be configured for use on mobile phones, such as those described above. One skilled in the art will also recognize that embodiments of the present invention may be adapted for play on conventional video game clients, such as video game consoles and/or personal computers.

Like the embodiments of the DJ game disclosed above, an objective of the game is to entice as many simulated clubgoers of a virtual club out onto a dance floor. However, instead of a player creating his or her own songs to play as described above, the player selects songs to play from songs that the player has stored on his or her portable music device and has "purchased" for use within the game.

Figure 3:
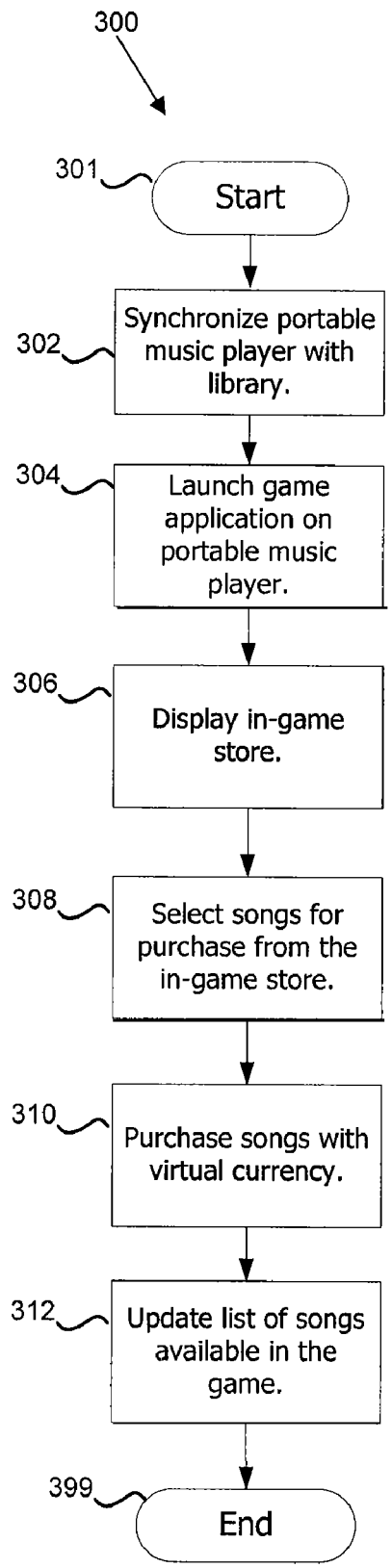
FIG. 3 is a flow diagram of a process for purchasing music for use within the game according to an embodiment.

FIG. 3 is a flow diagram of a process 300 for purchasing music for use within the game according to an embodiment. Process 300 beings at step 301 and continues to step 302, where a player synchronizes his or her portable music player with a library of music. For example, according to an embodiment, the portable music player may be synchronized with software on a personal computer in order to access the library of music that the user has downloaded to the personal computer. The portable music player is linked to the personal computer and synchronized with the player's music library. Once the portable music player has been synchronized and the player's music selections loaded onto the portable music player, the portable music player may be disconnected from the personal computer. One skilled in the art will recognize that the portable music player may comprise other types of music players and that that the process of downloading content to the music device may vary. Furthermore, the step of downloading content to the device may also be optional in some embodiments. A player may be satisfied with audio content that is already available on the portable music player and may not wish to download additional content onto the device each time the game is played.

The process continues with step 302, where the user launches the game program on the portable music player. The game software may be stored on game media (such as game media 112), a removable media (such as removable storage media 126), downloaded to the device and stored in a local memory (such as RAM 134, flash memory 144, and/or storage 124), and/or be installed in a memory residing in the device at the time that the device is manufactured (such as ROM 146). In a preferred embodiment, the game program is downloaded to the portable music player when the player synchronizes the portable music player with the player's library of content. Content might include audio files, images, video content, and/or executable programs such as games. Content may be purchased, for example, from on-line from Internet-based retailers or may be obtained from copies of content obtained from physical media, such as optical disks (e.g. CDs and/or DVDs).

After the game program is launched in step 302, an in-game store user interface is presented to the player. The in-game store interface enables the player to select songs to be integrated into the game. The songs are selected from the library of songs found on the player's portable music device.

The player selects one or more songs for purchase in the game from the library of music stored on the portable music device (step 308). Once the songs have been selected, the user has the option to purchase the songs for use in the game. Songs are purchased with virtual currency. Virtual currency may be awarded based upon performance in the context of game play and/or in some instances may be purchased for use within the game. At the outset of the game, a user may be provided with a predefined starting amount of virtual currency that enables the player to being building a "crate" of music for use within the game. The player's crate of music comprises a list of music that the user has at his or her disposal and may be played in the virtual club during the course of the game. As the player progresses in the game, he or she may earn additional virtual currency, which can, in turn be used to purchase additional music to augment the collection of music that the player has available for play within the game.

According to some embodiments, a player's crate of music is persistent between gaming sessions and may be shared with other players. The crate may be stored implemented as metadata stored in a persistent memory on the portable music player, such as game media (such as game media 112), a removable media (such as removable storage media 126), and/or a local memory (such as flash memory 144, and/or storage 124). The crate metadata may also be synchronized with the player's content library in order to backup the metadata. For example, in embodiments where the portable music device is synchronized with a player's content library stored on a personal computer, the crate metadata may be automatically copied from the portable music player to the player's personal computer for backup (and possibly sharing of the crate metadata with other players).

The crate metadata comprises a list of audio files located on the player's portable music player that the user has purchased in the game's virtual store in order to allow the player to play those songs within the game. The crate metadata does not, however, include the actual audio files comprising the songs in a players' crate. Thus, if a player shares his or her crate with another player, the audio content reference in the crate is not also shared with the other player. Also, in the event that a particular audio file referenced in the crate is remove from the portable music player or is otherwise unavailable, the player is given a credit of virtual currency representing a refund of the purchase price of the song.

Returning now to process 300, at step 310, the player purchases the songs selected in step 308 using virtual currency. According to an embodiment, each song may be purchased for an equal amount of virtual currency. However, according to other embodiments, songs may be individually assigned prices. For example, new songs may be assigned a higher price than older songs in some embodiments. The amount of virtual currency that the player has will be decremented by the total purchase price for the songs selected by the player.

If the player does not have sufficient virtual currency available to complete the purchase, the player will be warned that insufficient virtual currency is available to make the purchase and the player will be prompted to selected fewer songs for purchase. The total amount of virtual currency that the player has may be stored as a variable in game media (such as game media 112), a removable media (such as removable storage media 126), downloaded to the device and stored in a local memory (such as RAM 134, flash memory 144, and/or storage 124), and/or be installed in a memory residing in the device at the time that the device is manufactured (such as ROM 146). In some embodiments, a player's virtual currency balance may be stored as part of the virtual crate metadata, while in other embodiments, the player's balance may be stored in a separate set of persistent metadata.

Once the songs have been purchased, the crate metadata is updated to include the newly purchased songs (step 312). The purchase process completes at step 399.

According to some embodiments, players may share their DJ crate with other players using other portable electronic device. The DJ crate may, in some embodiments, be shared using the alphanumeric encoding scheme for transferring content between portable electronic devices described above. Alternatively, the file or set of files comprising the DJ crate may be transferred to the receiving player's portable electronic device via a network or other connection.

When loading a DJ crate obtained from another user, the game logic makes a determination whether the portable electronic device of the player receiving the DJ crate contains the audio files referenced in the DJ crate. The game program may then alert the receiving player that the player's portable electronic device lacks certain files referenced in the DJ crate received from the other player. The player may then optionally exit the game in order to download the missing content or may chose to ignore the missing content. If the player chooses to ignore the missing content, the player may choose to continue to play the game with whatever content is available on the player's portable electronic device.

Figure 4:
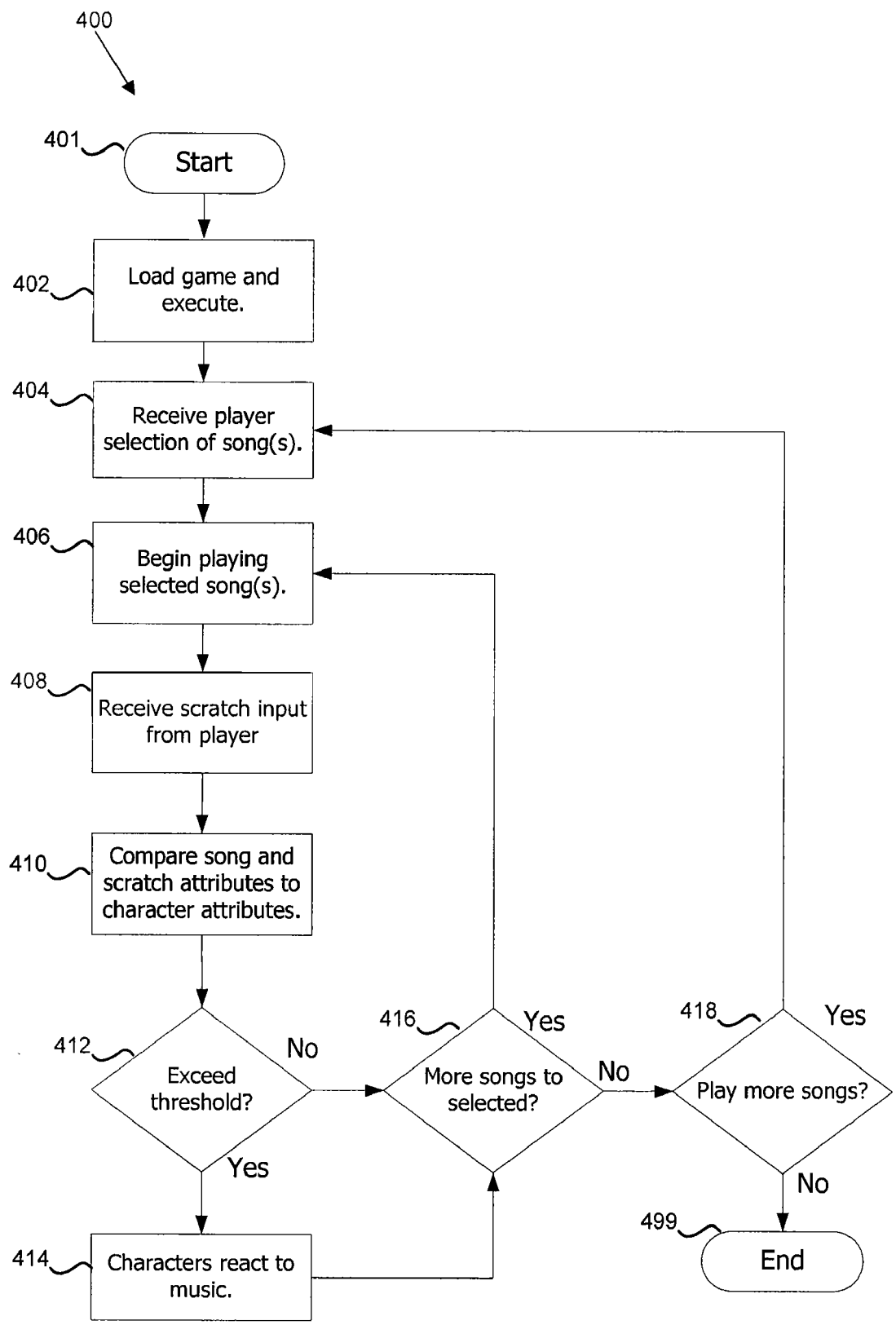
FIG. 4 is a flow diagram of a game loop including using purchased music within the game according to an embodiment.

FIG. 4 is a flow diagram of a game loop 400 including using purchased music within the game according to an embodiment. Once a user has purchased music for use within the game, such as through process 300 described above, the user may then access and play portions of the game where the player performs as a DJ in a virtual club.

Game loop 400 begins at step 401 and proceeds to step 402, where the game software is loaded and executed on the portable electronic device. Step 402 is similar to step 301 of process 300 described above. Step 402 may also be optional in some embodiments as the game program may have already been loaded on the portable electronic device and execution of the game program already begun. For instance, the game program may have already be initialized by the player in order to purchase music, such as in process 300 described above. According to some embodiments, persistent data such as a player's crate (described above) may be loaded and/or other persistent game-related data may be loaded.

Processing continues at step 404 where the game receives a selection of one or more from the player. The selected songs will be played in the virtual club in an attempt to entice as many simulated club-goers as possible onto a simulated dance floor of the club. The player may select any song or songs that the player has purchased and stored in the player's crate.

According to some embodiments, the game program may provide visual clues to the player as to the types of songs that the player may want to select and play in the game in order to entice as the simulated club-goers in the virtual club onto the dance floor. For example, the appearance of the characters, such as the type of clothing that they are wearing, and/or the appearance of the virtual club, such as the type of lighting and/or the type of decorations that are included in the simulated club environment, may provide clues to the player as to the types of song selections that may most successfully entice the most simulated club-goers out onto the dance floor.

Once the player has selected a song or set of songs to be played, the game begins to play the selected songs (step 406). As described above, the player's crate contains metadata that identifies songs on the portable music player that the player has purchased for use in the game. The crate metadata may include a pointer or other identifier of a memory location where an audio file corresponding to a particular song may be found on the portable music player. In a typical embodiment, songs are stored in a persistent memory on the portable music player, such as game media (such as game media 112), a removable media (such as removable storage media 126), and/or a local memory (such as flash memory 144, and/or storage 124). However, in some embodiments, copies of data files associated with songs may also be loaded in volatile memory such as RAM 134.

In step 406, the game program code begins playing a song from the set of one or more songs selected by the player in step 404. As a song is played, the player can listen to the song via an audio output from the portable music player. For example, the portable music player may output an audio signal to a speaker or a set of headphones to enable the player to listen to the song being played.

After the game program code begins playing a song from the set of one or more songs selected by the user, the game may receive scratch input from the player (step 408). The player controls a representation of a DJ turntable to create a "scratch"—a sound produced by manipulating a record (typically vinyl) to move forward or backward past a stylus on a turntable to produce a sound. Scratching may produce various sound effects which are integrated into the game.

According to some embodiments, the portable electronic device comprises a clickwheel interface configured for receiving user inputs that instruct the portable music player to execute various functions such as song selection. The clickwheel interface may be exposed to game by an SDK (software development kit) which includes an application programming interface (API) that enables the game program to interact with the hardware and/or software that comprise the portable music player.

According to an embodiment, the portable music device generates events in response to user input via the various user interface devices included on the portable music player, such as a clickwheel, and the game logic receives those events via the API. The game logic then may use these events to determine, at least in part, the animation of one or game components. For example, if the player rotates the clickwheel clockwise, events may be generated by the portable electronic device indicating the direction and velocity at which the clickwheel has been rotated. The game logic may then receive these events and use them to control at least in part the animation of one or game components.

According to some embodiments, a player may execute a scratch in the game by rotating the clickwheel of the portable music device clockwise or counterclockwise in order to execute the scratch. In response to the player's input, the visual representation of a DJ turntable described may be animated such that the animation of the turntable is synchronized with the player's manipulation of the clickwheel. Thus, if for example, the player rotates the clickwheel in a clockwise direction, the game logic will produce a corresponding animation where the DJ turntable rotations in a clockwise direction.

One skilled in the art will recognize that the invention is not limited to receiving user input via a clickwheel device and that other user interface devices may be used to capture player input, such as (but not limited to) slider buttons, rocker buttons, a thumbwheel, a touch screen, a joystick and/or a combination of other buttons or controls.

According to some embodiments, the game program converts scratching inputs received from the player into sound effects that are overlaid onto an audio stream of a song currently being played. However, in some other embodiments, the sound effects are integrated into the audio stream of the song being played in the game.

In step 410, one or more attributes of the song being played are compared to one or more attributes of the each of the simulated club-goers to determine whether the song is of a type that each of the simulated club-goers prefers. The comparison of song attributes to character preferences is described in detail above with respect to process 300.

After the attributes of the song being played are compared to the attributes of each of the simulated club-goers in step 410, a determination is made whether the song has exceeded a predetermined threshold by matching attributes associated with each of the simulated party-goers (step 412). The attributes of the song being played may affect the mood of the simulated club-goers, which may, in turn encourage the simulated club-goers to dance or alternatively discourage the simulated club-goers from dancing. If a song is of a genre that a character does not like or the song has attributes that that character does not like, then the character may not dance to the song. In contrast, if the song is of a genre that the character likes or has attributes that the character likes, then the character may dance to the song.

For example, a character may prefer songs that are from the rock and hip hop genres, and may have a preference for songs with a fast beat. The character may however dislike music from the country genre and may also dislike music with a slow beat. Subcategories may also be defined for each category or genre of music. For example, a character that enjoys rock music may enjoy classic rock but dislike punk rock. Category and subcategory information for a song may be determined, in some embodiments, from metadata associated with an audio file.

Furthermore, how a song is manipulated by a player may also affect the mood of the game characters. For example, according to some embodiments, a player may manipulate the pitch of a song during playback and/or scratch using a click-wheel interface of the portable music player (or an alternative user interface where the portable music player does not include a clickwheel).

For each character for which the match exceeds the threshold for the character, the characters will react to the music in step 414. Characters for which the threshold was exceeded, but are not currently on the dance floor may enter the dance floor and begin dancing. Characters for which the threshold was exceed and are already on the dance floor will continue dancing. For those characters for which the threshold was not exceeded, the characters may leave the dance floor if already on the dance floor. According to some embodiments, a number points and/or virtual currency may be awarded to a player based upon the number of virtual club-goers that the player is able to entice onto the dance floor. According to other embodiments, the player may also be penalized by, for example, deducting a number of points and/or virtual currency, for each of the simulated party-goers that leave the dance floor.

At step 416, a determination is made whether any more songs have selected by the player have yet to be played. If more songs are yet to be played, then the process continues at step 406 where a next song from the songs selected by the player is played. Otherwise, the process continues with step 418.

At step 418, a determination is made whether the player would like to play any more songs. According to an embodiment, the game may display a graphical prompt asking the player whether they would like to play more songs upon the completion of the last song played by the player. If the player indicates that the player would like to play more songs, the process continues with step 404. Otherwise, the process terminates at step 499.

According to some embodiments, prior to the termination of the game loop in step 499, performance statistics and/or other data may be uploaded from the portable electronic device to a server. The uploaded data may be aggregated with other data from the same user or with data generated by other players, for example, to produce player rankings and/or for other purposes, such as awarding players with point bonuses, virtual cash, and/or other prizes for reaching certain goals defined by the developers of the game. According to an embodiment, data from the portable electronic device may be stored on the portable electronic device until the device is synchronized with the player's personal content library stored externally, on a personal computer or other storage medium configured for storing electronic data. According to some embodiments, the content on the portable electronic device may be synchronized with a player's content library stored externally on a personal computer, the personal computer including software configured for communicating with the portable electronic device and for extracting data from and storing data to the portable electronic device. The software may also be configured to download game data such as performance statistics to a personal computer, and may also upload data to a network-connected server according to some embodiments. Other network-enabled software or services may also be used to download game data from the portable electronic device for upload to a network server, such as a game server, for sharing of data and/or aggregation of data for determining of performance statistics.

In addition to uploading game data from the portable electronic device to a network server, the game logic may also be configured to perform micro-transactions such as initiating a download of game content, such as songs, from the network server to the portable electronic device.

The transfer may be initiated while the device is being synchronized with a player's content library, or may in some alternative embodiments, be initialized according to some predetermined schedule. According to some embodiments, the downloads may performed via wired network connections while in other embodiments, the portable music player comprises a wireless communication interface that enables the device to connect to a wireless mobile phone network, a wireless WAN, and/or other wireless network.

According to yet other embodiments of the present invention, a series of DJ mini-games are provided: a piece drop game, a set of DJ scratch games, and a needle balance game. Some of the mini-games involve the player manipulating a simulated turntable via a user interface input of the portable electronic device. Other embodiments involve the player manipulating the needle of an analog-style meter via a user interface input of the portable electronic device.

In the piece drop game, a turntable and narrow channel are displayed on a user interface of the game. The narrow channel may be oriented either horizontally or vertically across the user interface output of the game. According to an embodiment, a series of wedges representing a "slice" of a record are generated by the game at an end of the narrow channel farthest from the turntable.

The turntable also includes a wedge-shaped representation, which may be rotated around the central axis of the turntable. According to some embodiments, the portable music player comprises a clickwheel interface for receiving user input, and a player may control the position of the wedge-shaped representation on the turntable by rotating the clickwheel clockwise or counter-clockwise. In response to player input via the clickwheel, the game logic events from the operating system of the portable electronic device indicating, for example, the speed and direction in which the player has rotated the clickwheel. The game logic translates the speed and rotation into corresponding positional information for the wedge-shaped representation on the turntable and animates the wedge-shaped representation to reflect the player's input. One skilled in the art will recognize that other embodiments of the invention may be configured to receive input from other types of user input devices found on a portable music player and use that input for controlling the position of the wedge-shaped representation on the turntable.

As the wedge-shaped pieces are generated at far end of the narrow channel, they slide along the channel toward the turntable. An objective of the game is to rotate the wedge-shaped representation on the turntable into a position that approximates the orientation of the wedge-shaped piece closest to the turntable while the closest wedge-shaped piece is within a designated region proximate to the turntable. For example, the narrow channel may have a region proximate to the turntable highlighted in a different color, surrounded by a bounding box, and/or otherwise distinguished from the remainder of the narrow channel. As a piece enters the region proximate to the turntable, the player attempts to orient the wedge-shaped representation on the turntable to a position approximate to that of the wedge-shaped piece currently within the highlighted region. If the player is able to match the orientation of the wedge-shaped representation on the turntable to that of the wedge-shaped piece in the highlighted region, the piece in the highlighted region will be cleared and the user may then accumulate points and/or virtual cash. However, if the player is unable to match the orientation of the wedge-shaped piece in the highlighted region before the piece traverses the highlighted region, the user may lose points and/or have a "life" meter decremented by one or more units. If the player misses more than a predefined number of wedges and/or the player's life meter decrements to zero, then the game is over.

In the DJ scratch game, a player controls a representation of a turntable to create a "scratch"—a sound produced by manipulating a record (typically vinyl) to move forward or backward past a stylus on a turntable to produce a sound. According to an embodiment of the DJ scratch game, a narrow channel and a turntable are displayed similar to those displayed for the piece drop game described above. Representations of records are generated by the game and enter the channel at the end farthest from the turntable. Each record includes indicia representing a scratch to be performed by the player. According to an embodiment, the indicia included on each record comprises a set of one or more curved directional arrows that indicate to the player which direction the turntable should be moved in order to execute a scratch. According to an embodiment, a record may include two or more directional arrows indicating that the player must move the turntable in multiple directions in order to execute the scratch depicted on the record. For example, a record may include two directional arrows forming a "V" shape indicating that the scratch requires the user to move the turntable is a first direction and then in a second opposite direction. Or for example, a record may include three directional arrows forming an "N" shape indicating that in order to execute the scratch, the player must move the turntable in a first direction, the move the turntable in a second opposite direction, and finally move the turntable back in first direction again.

According to some embodiments, the portable music player includes a clickwheel interface for receiving user inputs, such as song selections. According to some embodiments, the clickwheel interface may be rotated clockwise and/or counterclockwise about a central axis. The game program may be able to access clickwheel events, such as direction of rotation and/or speed of rotation of the clickwheel via an API provided on the portable music player to enable third-party software and/or hardware to interface with the device. Thus, a player can execute a scratch indicated on a representation of a record by manipulating the clickwheel clockwise and/or counterclockwise (according to the scratch) as if the clickwheel were a turntable. However, one skilled in the art will recognize that portable music players including other types of user interfaces may also be used. For example, a portable music player may include other user interface devices for capturing player input, such as slider buttons, rocker buttons, a thumbwheel, a touch screen, a joystick and/or a combination of other buttons or controls.

As the records approach the turntable, the player attempts to execute the scratch depicted on the record closest to the turntable. According to an embodiment, the narrow channel may include an emphasized area proximate to the turntable (such as that described above with respect to the piece drop game). As a representation of a record traverses the emphasized area, the player must execute the scratch indicated on the record prior to the representation of the record exiting the emphasized area. If the player is able to successfully complete the scratch in time, then the representation of the record will be cleared from the screen and the player may be awarded points and/or virtual currency for use within the game. However, if the player is unable to execute the scratch before the record lose points and/or have a "life" meter decremented by one or more units. If the player misses more than a predefined number of wedges and/or the player's life meter decrements to zero, then the game is over.

According to another embodiment of the DJ scratch game, a representation of two DJ turntables are displayed. The two turntables are oriented side-by-side on the screen, and each turntable may have one or more colored wedges covering at least a portion of the surface area of the turntable. Each turntable includes a needle with one end anchored at the spindle in the center of the turntable. The other end of the needle is free to sweep around the circumference of the turntable in either a clockwise or counterclockwise direction.

An objective of the game is to clear the colored wedges covering portions of the turntable surface by sweeping over the colored wedges with the needle in order to wipe off the wedges. A wedge may require several passes of the needle in order to completely remove wipe the wedge away. As result, the player may need to control the needle to pass back and forth over a wedge multiple times, resulting in a scratching-like movement.

Some embodiments also include a needle balance game. An objective of the game is to maintain the position of a needle of an analog style meter in a within a predefined range. As the game progresses, game logic controlling the animation of the needle causes the needle to drift clockwise or counterclockwise outside of the predefined range. The player attempts to maintain the position of the meter within the predefined range.

According to some embodiments, the portable electronic device comprises a clickwheel interface. A player may "push" the needle back into position by rotating the clickwheel in the direction that the player wishes to push the needle. One skilled in the art will recognize that the invention is not limited to receiving user input via a clickwheel device and that other user interface devices may be used to capture player input, such as slider buttons, rocker buttons, a thumbwheel, a touch screen, a joystick and/or a combination of other buttons or controls.

According to some embodiments, songs stored on the player's portable electronic device may be integrated into the game play of each of the DJ mini-games. For example, in some embodiments, songs stored on the portable electronic device may be selected either by the player or selected by the logic included in the game program. The selected songs may then be played as background music to in the game and sound effects may be overlaid over the song in response to events in the game in order to further enhance the player's experience.

Game play may also be further enhanced by analyzing a song selected for play during a game and synchronizing game events to the song. For example, the game logic may perform a "beat matching" analysis on the song and synchronize game events to the beat of the song. For instance, the introduction of new game pieces to the channel in the piece drop game may be synchronized to the beat of a song selected for play in the background, or the introduction of new representations of records into the channel in embodiments of the DJ scratch game may also be synchronized with the beat of the song. Furthermore, the motion of the needle in the needle balance game may also be synchronized to with various characteristics of a song such as beat or volume.

Figure 5:
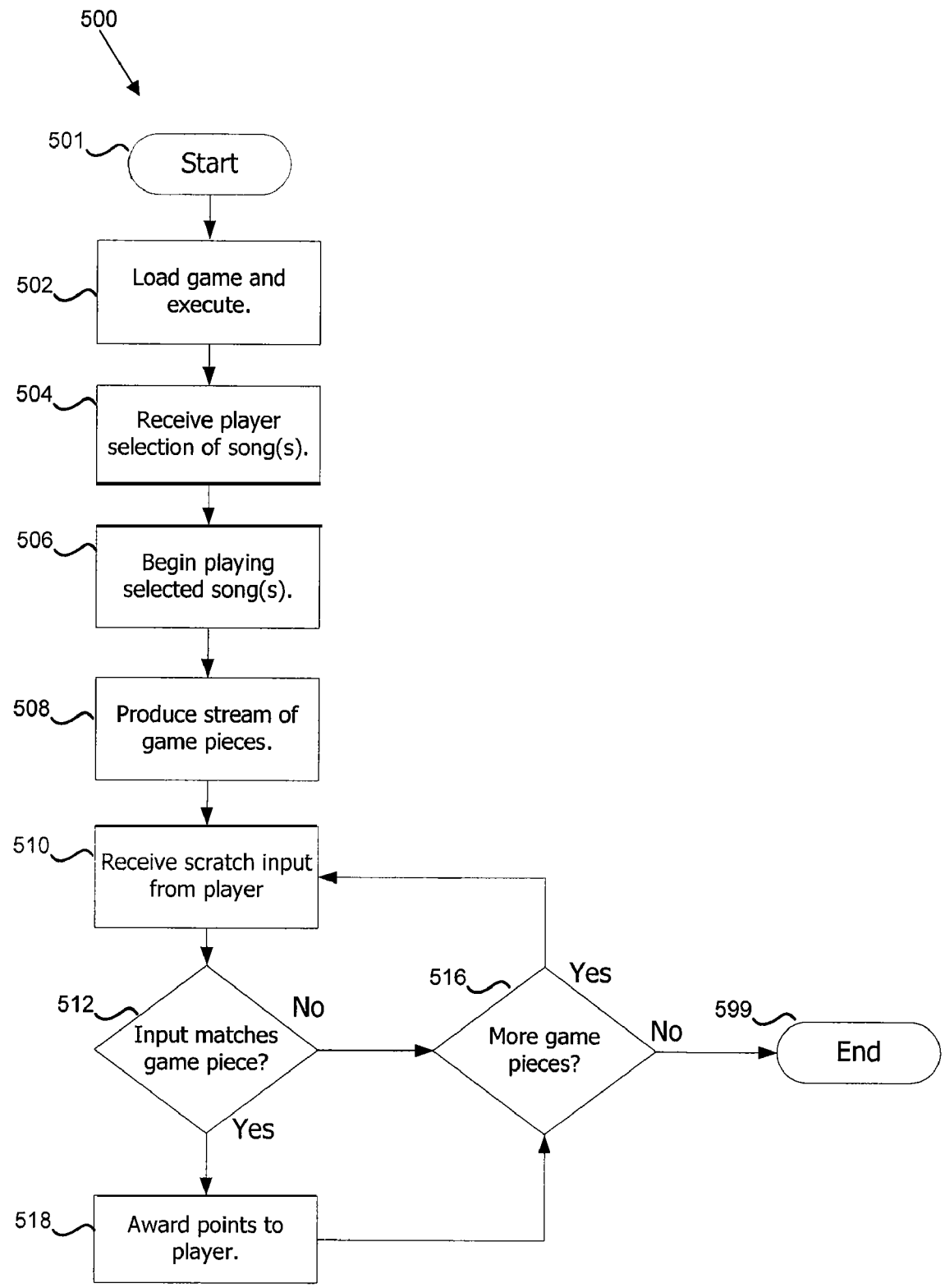
FIG. 5 is a flow diagram of a game loop of a DJ scratch game according to an embodiment.

FIG. 5 is a flow diagram of a game loop 500 of a DJ scratch game according to an embodiment. Game loop 500 begins at step 500 and continues to step 502 where the portable electronic device loads the game program software from a memory and executes the program code to initialize the game and place the game in a state where the game is ready to receive user input. Step 502 is similar to step 302 of process 300 described above.

After initializing the game in step 502, the game logic may receive a selection of one or more songs to be played during the course of the game. According to an embodiment, the player selects from songs stored in a DJ "crate"—a persistent data structure that maintains a list of a player's purchased music (described above). However, according to some embodiments, a player may specify any audio file, such as an MP3 file, stored on the portable electronic device, so long as the game software has access to the audio file.

At step 506, the game program code begins playing a song from the set of one or more songs selected by the player and/or the game logic in step 504. As a song is played, the player can hear the song from via an audio output from the portable music player. For example, the portable music player may output and audio signal to a speaker or a set of headphones to enable the player to listen to the song being played.

At step 508, the game logic begins introducing a stream of game pieces into the end of the narrow channel farthest from the turntable. According to an embodiment, the game pieces are circular disks colored to look like a record or a compact disk. As described above, each disk comprises one or more indicia, such as arrows, representing a "scratch" to be performed, each indicia representing a direction in which the player should rotate the turntable in order to perform the scratch depicted upon the disk. The game pieces advance from the end of the channel farthest from the turntable to the end of the channel closest to the turntable.

Once the game logic has begun to produce a stream of game pieces (step 508), the game may receive scratch input from the user via an input. As described above, the channel may include an emphasized or highlighted area, and as a game piece moves into the emphasized area, the player attempts to perform the scratch indicated on the game piece, and if successful, clears the game piece and may be awarded points and/or virtual cash. Scratch input from the user may be received via user interface devices included on the portable electronic device. For example, according to some embodiments, the portable electronic device may comprise a portable music player, such as an MP3 player or other portable music player configured to play digital audio files, and the portable music player includes a clickwheel interface for receiving user input such as song selections.

At step 512, a determination is made whether the player input matches the scratch depicted upon the game piece currently within the emphasized area or highlighted area. If the player input matches the scratch depicted upon the game piece, the game loop proceeds to step 518. Otherwise, the game loop continues to step 516.

At step 518, the player has successfully performed the scratch motion depicted on the game piece. The game logic may then reward the player with a number of points and/or virtual cash that may be used to purchase additional songs for use in the game. The game loop then continues on to step 516.

At step 516, a determination is made whether there are any more game pieces to be processed. For example, according to an embodiment, the game logic determines whether any more game pieces are still advancing through the channel toward the turntable. In some embodiments, the game logic also determines whether the remaining play time of a song playing in the background is sufficient to release additional game pieces into the channel, and if sufficient time remains, the game logic introduces one or more additional game pieces into the channel. If more game pieces still remain to be processed, then the game loop returns to step 510. Otherwise, the game loop terminates at step 599.

Figure 6A:
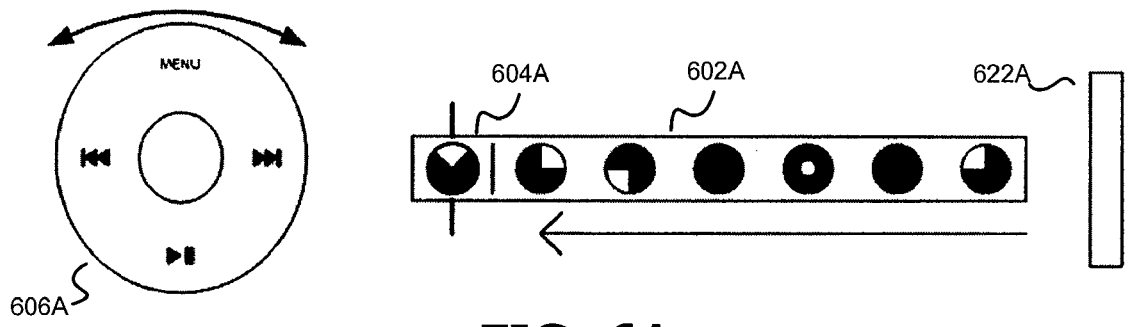
FIG. 6A is a block diagram illustrating the interaction between a clickwheel controller and a game interface according to an embodiment.
Figure 6B:
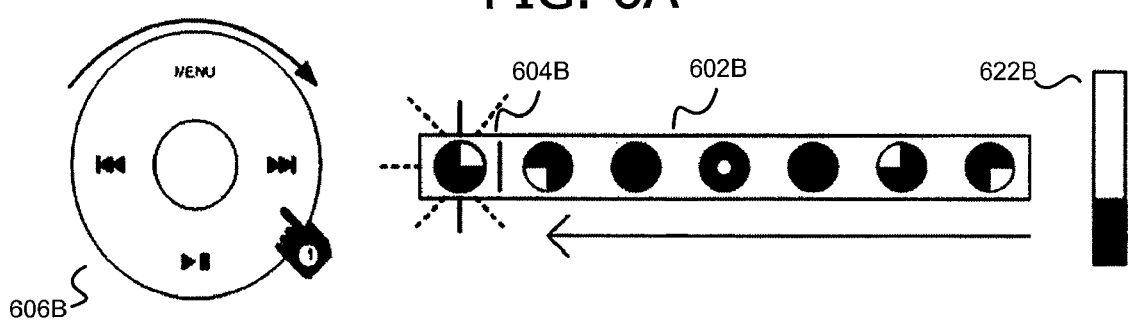
FIG. 6B is another block diagram illustrating the interaction between a clickwheel controller and a game interface according to an embodiment.
Figure 6C:
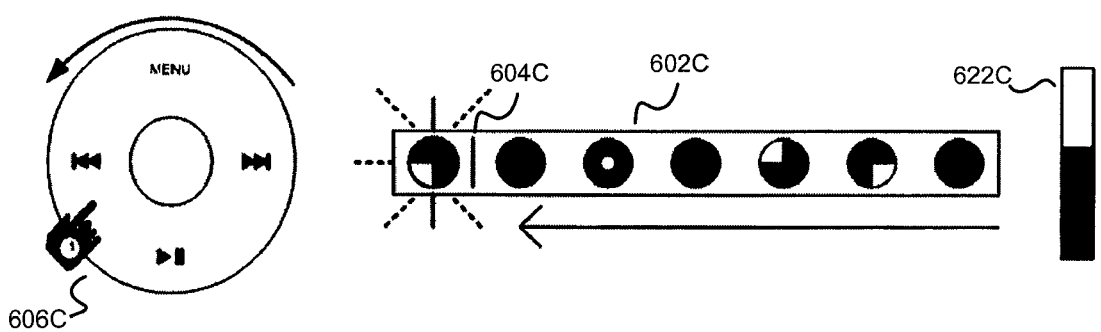
FIG. 6C is yet another block diagram illustrating the interaction between a clickwheel controller and a game interface according to an embodiment.

FIGS. 6A, 6B, and 6C are block diagrams illustrating the relationship between player input received via a clickwheel input device and game elements according to an embodiment. FIG. 6A is a block diagram depicting the interaction between a clickwheel device 606A and a game interface such as that of the piece drop game described above. The game interface includes a narrow channel 602A through which a series of record-shaped representations move from right to left. Channel 602A includes an emphasized area 604A at the far left end of the channel that includes a record-shaped representation, the animation of which is controlled by the player input on the clickwheel. For example, if the player rotates the clickwheel clockwise, the game logic will animate the record-shaped representation such that the wedge-shaped highlighted portion rotates clockwise, and if the player rotates the clickwheel counterclockwise, the game logic will animate the record-shaped representation such that the wedge-shaped highlighted portion rotates counterclockwise.

One skilled in the art will recognize that the embodiments depicted in FIGS. 6A, 6B and 6C are merely illustrative and that the game interface may vary. For example, in some embodiments, a simulated DJ turntable, the animation of which is controlled by the user input via the clickwheel, may be included in the game interface instead of or in addition to the user-controlled animation of the record-shaped representation in emphasized area 604A of channel 602A.

According to some embodiments, the game logic introduces a stream of record-shaped representations into the channel at fixed intervals, while in some alternative embodiments, the game logic introduces a stream of record-shaped representation in decreasing intervals so that the challenge of the game increases as a player progresses through a level.

Some embodiments may also synchronize the introduction of record-shaped representations and/or the position of the wedge-shaped highlighted portions on the record-shaped representations with the beat of a song being played in the background. The song may be selected from the player's crate or may be selected from other audio content provide with the game.

As a record-shaped representation approaches the emphasized area, the player rotates the clickwheel in order to position the wedge-shaped highlighted portion of record-shaped representation in emphasized area 606A to match the position of the highlighted portion of the record-shaped representation in channel 602B closest to the emphasized area.

According to an embodiment, a matching meter 622A is also included. In the embodiment depicted in FIG. 6A, the matching meter is represented by a bar that is filled in as the player earns points for matching the position of the wedge-shaped highlight on the player-controlled record-shaped representation to the record-shaped representations in channel 602A. The closer the match, the more points that the player receives and more of bar of matching meter 622A is filled in from bottom to top. When the meter is filled to the top, the player has completed a song and the game logic will transition to a new song. One skilled in the art will recognize that the bar graph representation of the matching meter is merely illustrative and that other representations may be used for indicating player progress, such as a numerical percentage representing a percentage of a level of the game that the player has completed.

FIGS. 6B and 6C illustrate progressively later states in the game illustrated in FIG. 6A. In FIG. 6B, the record-shaped representations have progressed further from right to left in channel 602B. As a record-shaped representation reaches the end of the channel, the representation disappears and may be replaced by another record-shaped representation entering the channel 602B from the left. The shaded bar of the matching meter 622B is also visible in FIG. 6B, indicating that the player has successfully matched the positions of the wedge-shaped highlighted portions of at least some of the record-shaped representations. FIG. 6C depicts an even later state in the game where the record-shaped representations have progressed farther down the channel 602C, and the shaded bar of the beat meter 622C representing the matches made by the player has been incremented closer toward to the top of beat meter 622C, indicating that the player is closer to completing the level of the game depicted in FIGS. 6A, 6B, and 6C. FIG. 6C depicts the player turning the clickwheel 604C counter-clockwise in attempt to match the position of the wedge-shaped highlighted region to the left-most record-shaped representation.

One skilled in the art will recognize that the game loops and processes described above are merely illustrative and that additional and/or alternative steps may be included in the game loops and/or processes, and that some steps may be executed in a different order and/or executed concurrently with other steps without departing from the spirit of the invention.

While the invention has been described with respect to exemplary embodiments, one skilled in the art will recognize that numerous modifications are possible. For example, the processes described herein may be implemented using hardware components, software components, and/or any combination thereof. Furthermore, the various embodiments of the present invention implemented for portable electronic devices that have been described above may also be implemented for use on conventional video game clients, such as video game consoles and/or person computers. Thus, although the invention has been described with respect to exemplary embodiments, it will be appreciated that the invention is intended to cover all modifications and equivalents within the scope of the following claims.

What is claimed is:

1. A method for playing a video game on a video game client, the video game client including a display output configured to produce a video signal for outputting a video game display that, when viewed, provides a viewer with a view of a simulated game environment, and user input devices for obtaining user input, the method comprising:
   executing a video game program on the video game client;
   selecting one or more audio files from a plurality of audio files using a first user input device;
   compositing the selected audio files into a song and creating an alphanumeric encoded string representative of the song, the alphanumeric encoded string including one or more of identifying names of the selected audio files in the song, locations of the selected audio files in the song, and instructions for assembling the song from the audio files; and
   exchanging the alphanumeric encoded string with another video game client to enable the other video game client to independently recreate the song without requiring the song itself to be transmitted to the other video game client determining, at least in part, an animation of one or more game characters, based upon one or more attributes of the song and one or more attribute of the one or more game characters; and animating a simulated environment including the one or more game characters, wherein animating the simulated environment includes producing a display output signal output via the display output.

2. The method of claim 1 wherein the video game client is a portable electronic device.

3. The method of claim 1, further comprising:
   displaying a user interface for purchasing songs for use in the game, wherein the user interface presents songs for which song data has been uploaded to the video game client.

4. The method of claim 3, further comprising:
   creating a persistent song list comprising a list of audio files of songs that have been purchased and are available for use within the game.

5. The method of claim 4, further comprising:
   comparing the persistent song list to the one or more song files stored on the video game client; and
   crediting the player with a refund for each song on the persistent song list that is no longer available on the portable music device.

6. The method of claim 1, wherein the video game is a dance club simulation, and wherein determining the animation of one or more game characters, based upon one or more attributes of the song and one or more attributes of the one or more game characters includes animating at least a subset of the one or more game characters to enter a virtual dance floor and dance in response to the playing of the song in the video game.

7. The method of claim 6, wherein an affinity value for the song is determined for each of the plurality of game characters, wherein the affinity value comprises a sum of the one or more attributes of the song that match one or more attributes of the one or more preferred types of music for the character, less the sum of the one or more attributes of the song that match one or more attributes of the one or more disliked types of music for the character.

8. The method of claim 7, wherein if the affinity value determined for a simulated character exceeds a predefined threshold, the simulated character will dance in response to the song, wherein if the affinity value determined for a simulated character does not exceed a predefined threshold, the simulated character will not dance in response to the song.

9. The method of claim 6, further comprising:
overlaying sound effects created by scratching on a simulated turntable, the sound effects generated based at least in part upon user input received from a user input device designed for receiving a song selection on the video game client.

10. The method of claim 9, wherein the sound effects are generated using a clickwheel user input device.

11. A method for playing a video game on a video game client, the video game client including a display output configured to produce a video signal for outputting a video game display that, when viewed, provides a viewer with a view of a simulated game environment, and user input devices for obtaining user input, the method comprising:
receiving a selection of a set of audio files from a plurality of audio files in a video game;
compositing the selected set of audio files into a composited audio file, wherein the composited audio file comprises audio data representing a song that includes audio data from each of the audio files in the selected set of audio files;
creating an alphanumeric encoded string representative of the composited audio file, the alphanumeric encoded string including one or more of identifying names of the selected audio files in the composited audio file, locations of the selected audio files in the composited audio file, and instructions for assembling the composited audio file from the selected audio files; and
exchanging the alphanumeric encoded string with another video game client to enable the other video game client to independently recreate the song without requiring the song itself to be transmitted to the other video game client determining, at least in part, an animation of one or more game characters, based upon one or more attributes of the song and one or more attributes of the one or more game characters; and animating a simulated environment including the one or more game characters, wherein animating the simulated environment includes producing a display output signal output via the display output.

12. The method of claim 11 wherein each audio file of the selected set of audio files comprises a separate audio track of a song.

13. The method of claim 11 wherein the plurality of audio files comprises MIDI files.

14. The method of claim 13 wherein the plurality of MIDI files comprises MIDI files composed at the same sample rate, key, and tempo.

15. The method of claim 11, further comprising:
exporting the composited audio file from the game for use as a ringtone.

16. The method of claim 15 wherein the composited audio file is exported as a MIDI ringtone.

17. The method of claim 11, wherein the video game is a dance club simulation, and wherein determining the animation of the plurality of simulated game characters, includes animating at least a subset of the plurality of simulated game characters to enter a virtual dance floor and dance in response to the playing composited audio file in the video game.

18. The method of claim 11, wherein plurality of simulated game characters has one or more associated attributes that define one or more preferred types of music and one or more disliked type of music.

19. The method of claim 18, wherein an affinity value for the song is determined for each of the plurality of game characters, wherein the affinity value comprises a sum of the one or more attributes of the song that match one or more attributes of the one or more preferred types of music for the character, less the sum of the one or more attributes of the song that match one or more attributes of the one or more disliked types of music for the character.

20. The method of claim 19, wherein if the affinity value determined for a simulated character exceeds a predefined threshold, the simulated character will dance in response to the song, and wherein if the affinity value determined for a simulated character does not exceed a predefined threshold, the simulated character will not dance in response to the song and will exit the virtual dance floor if already dancing.

21. A method for playing a video game on a video game client, the video game client including a display output configured to produce a video signal for outputting a video game display that, when viewed, provides a viewer with a view of a simulated game environment, and user input devices for obtaining user input, the method comprising:
creating a song by selecting one or more audio files from a plurality of audio files using one of said user input devices, and compositing the selected audio files into the song;
playing the song in the video game;
creating an alphanumeric encoded string representative of the song, the alphanumeric encoded string including one or more of identifying names of the selected audio files in the song, locations of the selected audio files in the song, and instructions for assembling the song from the audio files;
exchanging the alphanumeric encoded string with another video game client to enable the other video game client to independently recreate the song without requiring the song itself to be transmitted to the other video game client;
using an input device intended for song selection as a scratch input device to produce a scratch input;
overlaying scratch sound effects produced by using the input device as a scratch input device over the song;
determining, at least in part, the animation of one or more game characters, based upon one or more attributes of the song and one or more attribute of the one or more game characters; and
animating the one or more game characters to produce an output video signal for display on a display device, where the output video signal, when viewed, provides a visual representation of a simulated game environment.

22. The method of claim 21, further comprising:
purchasing the song from a plurality of songs stored on the video game client using virtual currency, wherein the virtual currency is used to purchase content not created for use within the game in order to enable the content to be used within the game.

23. The method of claim 21, wherein the video game is a virtual nightclub simulation where player input determines at least in part song selection, and wherein the song selection determines at least in part a reaction of the one or more game characters.

* * * * *